(12) United States Patent
Landis et al.

(10) Patent No.: US 11,691,357 B2
(45) Date of Patent: Jul. 4, 2023

(54) THERMOPLASTIC COMPOSITE PANEL SYSTEMS AND METHODS

(71) Applicant: ROHR, INC., Chula Vista, CA (US)

(72) Inventors: Samantha Landis, Tustin, CA (US); Guinevere Berg, Encinitas, CA (US); Andrew Cai, San Diego, CA (US); Johann Steven Schrell, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 469 days.

(21) Appl. No.: 16/780,569

(22) Filed: Feb. 3, 2020

(65) Prior Publication Data

US 2021/0237373 A1 Aug. 5, 2021

(51) Int. Cl.
| | | |
|---|---|---|
| *B29C 43/00* | (2006.01) | |
| *B29C 70/00* | (2006.01) | |
| *B29C 70/42* | (2006.01) | |
| *B29C 43/18* | (2006.01) | |
| *B29C 65/00* | (2006.01) | |
| *B29K 101/12* | (2006.01) | |
| *B29K 105/06* | (2006.01) | |
| *B29L 31/30* | (2006.01) | |

(52) U.S. Cl.
CPC ............ *B29C 70/42* (2013.01); *B29C 43/003* (2013.01); *B29C 43/18* (2013.01); *B29C 66/721* (2013.01); *B29K 2101/12* (2013.01); *B29K 2105/06* (2013.01); *B29L 2031/3076* (2013.01)

(58) Field of Classification Search
CPC ....... B29C 43/00; B29C 43/003; B29C 43/10; B29C 43/18; B29C 66/00; B29C 66/70; B29C 66/72; B29C 66/721; B29C 70/00; B29C 70/40; B29C 70/42
See application file for complete search history.

(56) References Cited

U.S. PATENT DOCUMENTS

| | | | |
|---|---|---|---|
| 9,744,699 | B2 | 8/2017 | Rousseau |
| 9,962,904 | B2 | 5/2018 | Hatanaka et al. |
| 2005/0025929 | A1 | 2/2005 | Smith et al. |
| 2010/0062238 | A1 | 3/2010 | Doyle et al. |

(Continued)

FOREIGN PATENT DOCUMENTS

| | | |
|---|---|---|
| DE | 102011076082 | 11/2012 |
| DE | 102015208946 | 11/2016 |

(Continued)

OTHER PUBLICATIONS

European Patent Office, European Search Report dated Jun. 23, 2021 in Application No. 21154713.8.

*Primary Examiner* — Jacob T Minskey
*Assistant Examiner* — Matthew Hoover
(74) *Attorney, Agent, or Firm* — Snell & Wilmer L.L.P.

(57) ABSTRACT

A method for forming a fiber-reinforced thermoplastic control surface includes forming first and second skins from a fiber-reinforced thermoplastic resin. The method further includes overmolding fiber-reinforced thermoplastic features onto the first skin and/or second skin, including stiffener structures, sidewalls, and/or hinges. The method further comprises welding or consolidating the first and second skins together, along with the associated internal features overmolded thereon to form a single-piece, stiffened, fiber-reinforced thermoplastic control surface.

19 Claims, 9 Drawing Sheets

(56) References Cited

U.S. PATENT DOCUMENTS

2015/0266260 A1* 9/2015 Fujioka .................... B32B 3/26
428/116
2018/0022438 A1   1/2018 Crespo Pena et al.
2018/0257759 A1   9/2018 Etling et al.

FOREIGN PATENT DOCUMENTS

JP    2015013484    1/2015
WO    2017062809    4/2017

* cited by examiner

THERMOPLASTIC COMPOSITE PANEL SYSTEMS AND METHODS

FIELD

The present disclosure relates generally to systems and methods for forming thermoplastic composite panels, and more specifically to systems and methods for forming thermoplastic composite flight control and high lift surfaces for aircraft.

BACKGROUND

Aircraft are typically equipped with control surfaces to maneuver the aircraft during flight as well as high lift surfaces to increase lift at low airspeed. The control surfaces are typically hingedly attached to wings, horizontal stabilizers, and/or vertical stabilizers. The horizontal and vertical stabilizers are collectively referred to as the empennage. As the control surfaces are rotated with respect to the wings or empennage, air flow is deflected and causes the attitude and/or flight path of the aircraft to change. Based on the locations and relative rotation directions of the control surfaces, the aircraft may slow, ascend, descend, roll, and/or turn.

SUMMARY

A method for forming a fiber-reinforced thermoplastic control surface is disclosed, comprising stacking plies of thermoplastic composite sheets to a desired thickness to form a first skin, transferring the first skin to an overmolding tool, heating the overmolding tool, compressing, via the overmolding tool, the first skin, injecting a discontinuous fiber-reinforced thermoplastic material between the overmolding tool and the first skin to form a stiffener structure, and simultaneously consolidating the first skin and the stiffener structure, wherein the first skin is formed into a desired shape in response to being compressed by the overmolding tool.

In various embodiments, the method further comprises cooling the overmolding tool, wherein the first skin and the stiffener structure harden in response to the overmolding tool cooling.

In various embodiments, the method further comprises removing the hardened first skin and stiffener structure from the overmolding tool.

In various embodiments, the method further comprises stacking plies of thermoplastic composite sheets to a second desired thickness to form a second skin, heating the second skin, compressing the second skin, and consolidating the second skin.

In various embodiments, the method further comprises attaching the first skin to the second skin.

In various embodiments, the first skin is attached to the second skin via a welding process.

In various embodiments, the method further comprises attaching the stiffener structure to the second skin.

A method for forming a fiber-reinforced thermoplastic control surface is disclosed, comprising stacking plies of thermoplastic composite sheets to a desired thickness to form a first skin, stacking plies of thermoplastic composite sheets to a desired thickness to form a second skin, transferring the first skin and the second skin to an overmolding tool, heating the overmolding tool, compressing, via the overmolding tool, the first skin and the second skin, injecting a fiber-reinforced thermoplastic material between the first skin and the second skin to form a stiffener structure, and consolidating the first skin, the second skin, and the stiffener structure, wherein the first skin and the second skin are formed into a desired shape in response to being compressed by the overmolding tool.

In various embodiments, the method further comprises attaching a sidewall to the first skin and the second skin.

In various embodiments, the sidewall is attached to the first skin and the second skin via at least one of a welding process, an adhesive bonding, and a mechanical fastener.

In various embodiments, the sidewall encloses the fiber-reinforced thermoplastic control surface.

A fiber-reinforced thermoplastic control surface is disclosed, comprising a first skin comprising a first leading edge, a first trailing edge opposite the first leading edge, a first side edge, and a second side edge opposite the first side edge, a second skin comprising a second leading edge, a second trailing edge opposite the second leading edge, a third side edge, and a fourth side edge opposite the third side edge, a stiffener structure extending from at least one of a first inner surface of the first skin and a second inner surface of the second skin, and a sidewall extending from at least one of the first inner surface of the first skin and the second inner surface of the second skin.

In various embodiments, the first skin comprises a first continuous fiber reinforced fabric and a first thermoplastic resin.

In various embodiments, the second skin comprises a second continuous fiber reinforced fabric and a second thermoplastic resin.

In various embodiments, the stiffener structure is formed from a first discontinuous fiber reinforced fabric and a third thermoplastic resin.

In various embodiments, the sidewall is formed from a second discontinuous fiber reinforced fabric and a fourth thermoplastic resin.

In various embodiments, the fiber-reinforced thermoplastic control surface further comprises a raised pad formed onto the second inner surface of the second skin, wherein the stiffener structure extends from the raised pad to the first inner surface of the first skin.

In various embodiments, the fiber-reinforced thermoplastic control surface further comprises a second stiffener structure extending from at least one of the first inner surface of the first skin and the second inner surface of the second skin, wherein, in response to the stiffener structure extending from the first inner surface of the first skin, the second stiffener structure extends from the second inner surface of the second skin, and, in response to the stiffener structure extending from the second inner surface of the second skin, the second stiffener structure extends from the first inner surface of the first skin.

In various embodiments, the stiffener structure is spaced apart from the second stiffener structure such that the stiffener structure does not make direct physical contact with the second stiffener structure.

In various embodiments, the fiber-reinforced thermoplastic control surface further comprises a hinge extending from at least one of the first skin, the second skin, and the sidewall.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
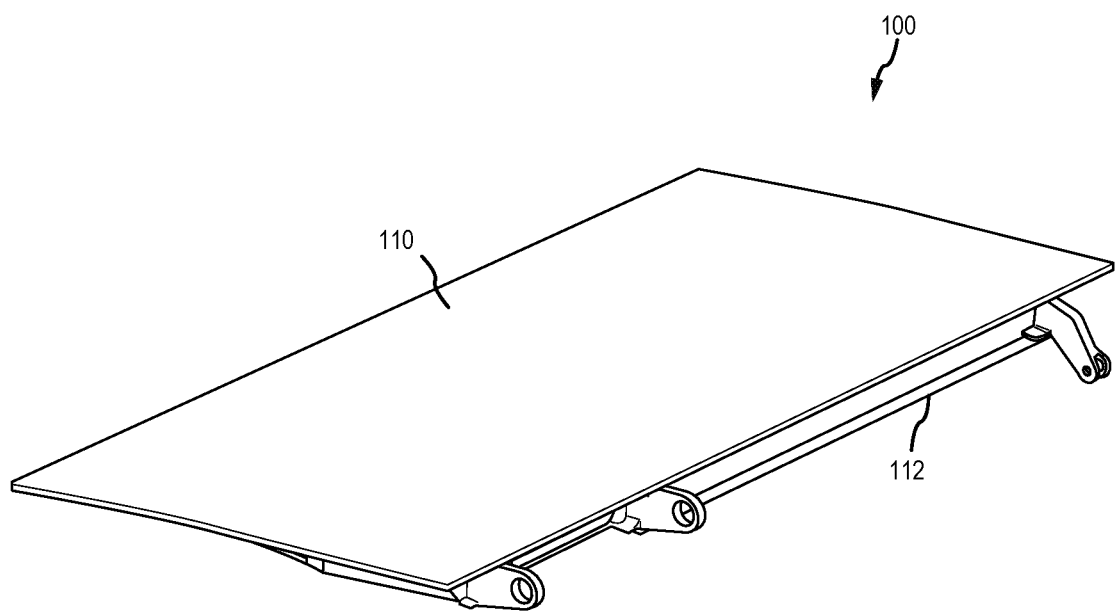
FIG. 1 illustrates an isometric view of an exemplary control surface, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In general, the example control surfaces described herein may be used with aircraft wings, stabilizers, or elevators, among other aerodynamic surfaces of an aircraft. Some examples of common names for these surfaces known to those practiced in the arts include but are not limited to flaps, ailerons, rudder, elevators, stabilators, elevons, spoilers, lift dumpers, speed brakes, airbrakes, trim tabs, slats, flaperons, spoilerons, and canards. These are henceforth referred to as control surfaces. In general, control surfaces may direct air flow during maneuvering and in-flight aircraft attitude adjustments. The example control surfaces described herein may provide increased resistance to impact damage than some known control surface constructions. Further, the example methods for manufacturing control surfaces described herein include fewer and lighter components than some known control surfaces. Thus, the example control surfaces described herein provide increased fuel efficiency and/or range to aircraft. Still further, the example control surfaces may be manufactured using an automated skin/stiffener manufacturing process, as described herein, which optimizes material usage and reduces cycle time.

A control surface, as described herein, includes a structural body comprising core stiffener structures and skin members, wherein the core stiffener structures are sandwiched by the skin members. In various embodiments, the skin members include a continuous fiber reinforced fabric and a thermoplastic resin. In various embodiments, the stiffener structures include a discontinuous fiber reinforced fabric and a thermoplastic resin. The reinforcing fiber to be used for the control surface has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for the control surface may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR). The thermoplastic resin to be used for the control surface also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

The control surface of the present disclosure may be formed by overmolding the stiffener structures onto one or both of the skin members, and subsequently welding the skin members together to form the control surface. In various embodiments, other features are overmolded onto the skin members, including sidewalls, raised pads, hinges, etc. In various embodiments, the skin members and stiffener features are consolidated simultaneously in a single-stage process, as described herein. In various embodiments, the skin members and stiffener features are consolidated separately in a two-stage process, as described herein.

Figure 2A:
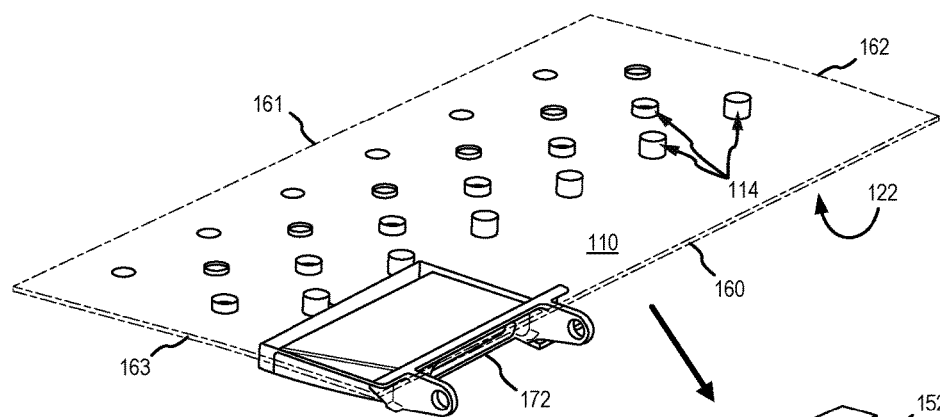
FIG. 2A illustrates a perspective view of a first skin (e.g., a top skin) of the control surface of FIG. 1, wherein the first skin is illustrated as being transparent to reveal internal stiffener structures extending from an inner surface of the top skin, in accordance with various embodiments.
Figure 2B:
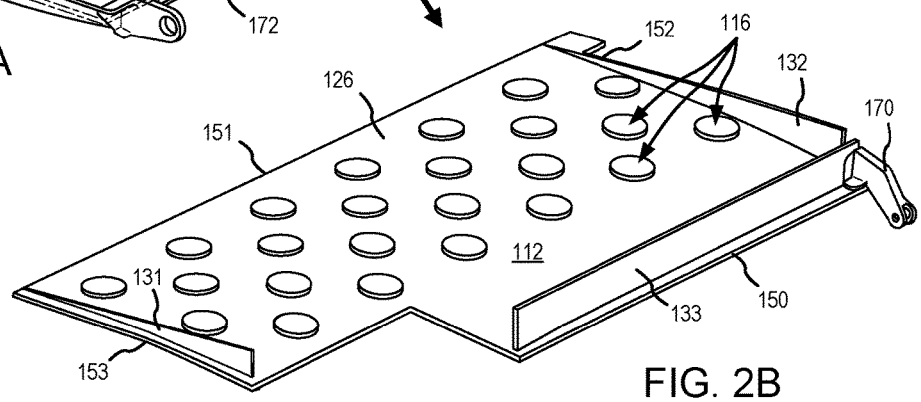
FIG. 2B illustrates a perspective view of a second skin (e.g., a bottom skin) of the control surface of FIG. 1, wherein the second skin comprises stiffener structures extending from an inner surface of the bottom skin, in accordance with various embodiments.

With combined reference to FIG. 1, FIG. 2A, and FIG. 2B, control surface 100 comprises a first skin 110, a second skin 112, and a plurality of stiffener structures 114 disposed therebetween. First skin 110 may comprise a generally planar sheet of fiber-reinforced thermoplastic material. Second skin 112 may comprise a generally planar sheet of fiber-reinforced thermoplastic material. First skin 110 may be formed from a first continuous fiber reinforced fabric, as described herein. Second skin 112 may be formed from a second continuous fiber reinforced fabric, as described herein. In various embodiments, the second continuous fiber reinforced fabric is the same or similar material as the first continuous fiber reinforced fabric.

In various embodiments, first skin 110 and/or second skin 112 may be formed by combining fiber fillers and thermoplastic resin at a pre-selected ratio to form a thermoplastic composite material with continuous fiber reinforcement. For example, first skin 110 and/or second skin 112 may be formed using automated fiber placement or automated tape laying. The pre-selected ratio may have any percentage or ratio of fiber filler to resin, such as 60% fiber filler and 40% resin. The mixture may range from 0% fiber filler and 100% resin to 100% fiber filler and 0% resin. In this regard, first skin 110 and/or second skin 112 may be continuous-fiber reinforced. However, it is contemplated herein that first skin 110 and/or second skin 112 may be discontinuous-fiber reinforced, in accordance with various embodiments.

In various embodiments, stiffener structures 114 may be formed onto an inner surface 122 of first skin 110 using an overmolding process (e.g., injection molding or compression molding). In this regard, first skin 110 and stiffener structure 114 are manufactured into a single piece. Stiffener structures 114 may be formed by combining fiber fillers and thermoplastic resin at a pre-selected ratio to form a thermoplastic composite material with discontinuous fiber reinforcement. The pre-selected ratio may have any percentage or ratio of fiber filler to resin, such as 60% fiber filler and 40% resin. The mixture may range from 0% fiber filler and 100% resin to 100% fiber filler and 0% resin. In this regard, stiffener structures 114 may be discontinuous-fiber reinforced.

In various embodiments, stiffener structures 114 and first skin 110 are manufactured in a single-stage process wherein a thermal press forming process and the overmolding process are completed simultaneously, or near simultaneously, in a single tool. In this regard, the continuous-fiber reinforced thermoplastic resin of the first skin 110 and the discontinuous-fiber reinforced thermoplastic resin of the stiffener structures 114 may be consolidated in a single stage.

In various embodiments, stiffener structures 114 and first skin 110 are manufactured in a two-stage process wherein a thermal press forming process is completed in one tool to form the first skin, and a secondary operation is utilized to perform the overmolding process in a second mold. In this regard, the continuous-fiber reinforced thermoplastic resin of the first skin 110 and the chopped-fiber reinforced thermoplastic resin of the stiffener structures 114 may be consolidated in two separate stages.

In various embodiments, each stiffener structure 114 may comprise a cylindrical or substantially cylindrical body extending from the first skin 110. In various embodiments, the cylindrical body is hollow. In various embodiments, the cylindrical body is solid. However, each stiffener structure 114 may comprise any geometry including round, polygonal, oval, etc. Each stiffener structure 114 may be discrete from the adjacent stiffener structures 114.

In various embodiments, a plurality of raised pads 116 may be formed onto an inner surface 126 of second skin 112 using an overmolding process (e.g., injection molding or compression molding). In this regard, second skin 112 and raised pads 116 are manufactured into a single piece. The raised pads 116 may reinforce respective areas where stiffener structures 114 are joined (e.g., via welding) to second skin 112. Raised pads 116 may be formed by combining fiber fillers and thermoplastic resin at a pre-selected ratio to form a thermoplastic composite material with discontinuous fiber reinforcement. The pre-selected ratio may have any percentage or ratio of fiber filler to resin, such as 60% fiber filler and 40% resin. The mixture may range from 0% fiber filler and 100% resin to 100% fiber filler and 0% resin. In this regard, raised pads 116 may be discontinuous-fiber reinforced.

In various embodiments, raised pads 116 and second skin 112 are manufactured in a single-stage process wherein a thermal press forming process and the overmolding process are completed simultaneously, or near simultaneously, in a single tool. In this regard, the continuous-fiber reinforced thermoplastic resin of the second skin 112 and the chopped-fiber reinforced thermoplastic resin of the raised pads 116 may be consolidated in a single stage.

In various embodiments, raised pads 116 and second skin 112 are manufactured in a two-stage process wherein a thermal press forming process is completed in one tool to form the first skin, and a secondary operation is utilized to perform the overmolding process in a second mold. In this regard, the continuous-fiber reinforced thermoplastic resin of the second skin 112 and the chopped-fiber reinforced thermoplastic resin of the raised pads 116 may be consolidated in two separate stages.

Although illustrated as having raised pads 116 formed onto second skin 112 and stiffener structures 114 formed onto first skin 110, raised pads 116 and stiffener structures 114 may alternatively be formed onto first skin 110 and second skin 112, respectively, without departing from the scope of the present disclosure.

In various embodiments, each raised pad 116 may comprise a cylindrical or substantially cylindrical body extending from the second skin 112. In various embodiments, the cylindrical body is solid. However, each raised pad 116 may comprise any geometry including round, polygonal, oval, etc. Each raised pad 116 may be discrete from the adjacent raised pads 116.

First skin 110 may comprise a first edge 160 (e.g., a leading edge, also referred to herein as a first leading edge), a second edge 161 (e.g., a trailing edge, also referred to herein as a first trailing edge) opposing the first edge 160, a first side edge 162 (e.g., a left edge or outboard edge), and a second side edge 163 (e.g., a right edge or inboard edge) opposing the first side edge 162.

Second skin 112 may comprise a first edge 150 (e.g., a leading edge, also referred to herein as a second leading edge), a second edge 151 (e.g., a trailing edge, also referred to herein as a second trailing edge) opposing the first edge 150, a first side edge 152 (e.g., a left edge or outboard edge), and a second side edge 153 (e.g., a right edge or inboard edge) opposing the first side edge 152.

A first sidewall 131 may be formed onto inner surface 126 of second skin 112 using an overmolding process. First sidewall 131 may be disposed at second side edge 153. A second sidewall 132 may be formed onto inner surface 126 of second skin 112 using an overmolding process. Second sidewall 132 may be disposed at first side edge 152. A third sidewall 133 may be formed onto inner surface 126 of second skin 112. In various embodiments, third sidewall 133 is formed onto inner surface 126 using an overmolding process. In various embodiments, third sidewall 133 is mechanically fastened to first skin 110 and/or second skin 112. In various embodiments, third sidewall 133 is joined to first skin 110 and/or second skin 112 via a thermoplastic welding process, as described herein. Third sidewall 113 may effectively serve as a spar for control surface 100. Third sidewall 133 may be disposed at first edge 150. Although illustrated as being formed onto second skin 112, first sidewall 131, second sidewall 132, and/or third sidewall 133 may alternatively be formed onto first skin 110 without departing from the scope of the present disclosure.

As previously mentioned, stiffener structures 114 may be formed from a discontinuous fiber reinforced fabric (also referred to herein as a first discontinuous fiber reinforced fabric). Similarly, first sidewall 131, second sidewall 132, and third sidewall 133 may be formed from a discontinuous fiber reinforced fabric (also referred to herein as a second discontinuous fiber reinforced fabric). In various embodiments, the second discontinuous fiber reinforced fabric is the same, or similar, material as the first discontinuous fiber reinforced fabric.

One or more hinges may be formed onto the first skin 110 and/or second skin 112. In the illustrated embodiment, a first hinge member 170 is formed onto inner surface 126 of second skin 112 and third sidewall 133. The first hinge member 170 may be formed onto the second skin 112 and third sidewall 133 using an overmolding process. In the illustrated embodiments, a second hinge member 172 is formed onto inner surface 122 of first skin 110. The second hinge member 172 may be formed onto the first skin 110 via an overmolding process. First hinge member 170 and/or second hinge member 172 may be formed by combining fiber fillers (e.g., carbon or glass) and thermoplastic resin at a pre-selected ratio to form a thermoplastic composite material with discontinuous fiber reinforcement. The pre-selected ratio may have any percentage or ratio of fiber filler to resin, such as 60% fiber filler and 40% resin. The mixture may range from 0% fiber filler and 100% resin to 100% fiber filler and 0% resin. In this regard, first hinge member 170 and/or second hinge member 172 may be discontinuous-fiber reinforced.

Although illustrated as having first hinge member 170 formed onto second skin 112, first hinge member 170 may alternatively be formed onto first skin 110 without departing from the scope of the present disclosure. Although illustrated as having second hinge member 172 formed onto first skin 110, second hinge member 172 may, in various embodiments, be formed onto second skin 112 without departing from the scope of the present disclosure.

Figure 2C:
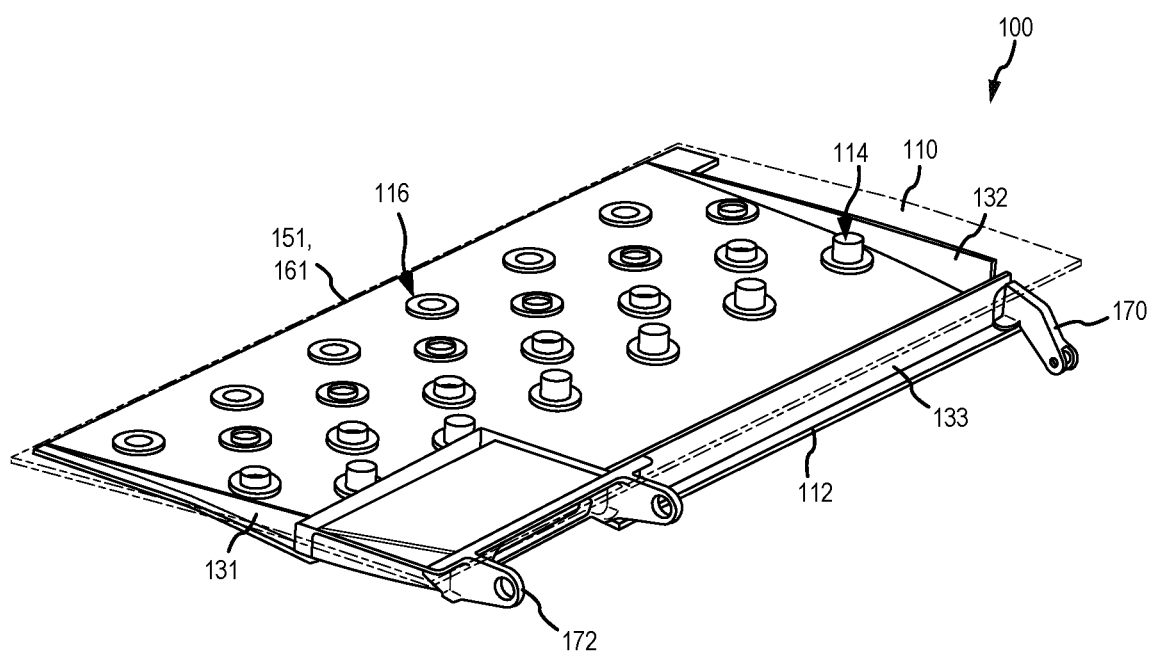
FIG. 2C illustrates an isometric view of the control surface of FIG. 1, with the first skin illustrated as being transparent to reveal the internal stiffener structures disposed between the first skin and second skin, in accordance with various embodiments.

After some or all of the internal structures (e.g., stiffeners, raised pads, sidewalls, and/or hinge members) have been overmolded onto the skins, the first skin 110 and second skin 112 may be joined to form a generally wedge shaped control surface 100. The first skin 110 and second skin 112 may be joined together via a welding process (e.g., resistance welding, induction welding, laser welding, conduction welding, etc.) wherein heat generated is sufficient to melt and flow the thermoplastic at weld interfaces (i.e., the interfaces between the first skin 110 and the second skin 112) to bond the two pieces together. In this regard, the trailing edges (i.e., second edge 151 and second edge 161) of first skin 110 and second skin 112 may be joined together, via welding, to enclose the trailing edge of control surface 100. Similarly, the first sidewall 131, the second sidewall 132, and the third sidewall 133 may be joined to the inner surface 122 of first skin 110 to enclose the sides and leading edge of the control surface 100. Furthermore, the stiffener structures 114 may be joined, via the welding process, to the raised pads 116. In this manner, the first skin 110 (and associated components) and the second skin 112 (and associated components) may be joined together to form a stiffened, monolithic structure (e.g., see FIG. 2C). In this regard, stiffener structures 114 are coupled to first skin 110 at a first end thereof and are coupled to second skin 112 (via raised pads 116) at a second, opposite end thereof. In this manner, stiffener structures 114 support or stiffen both first skin 110 and second skin 112.

Figure 3:
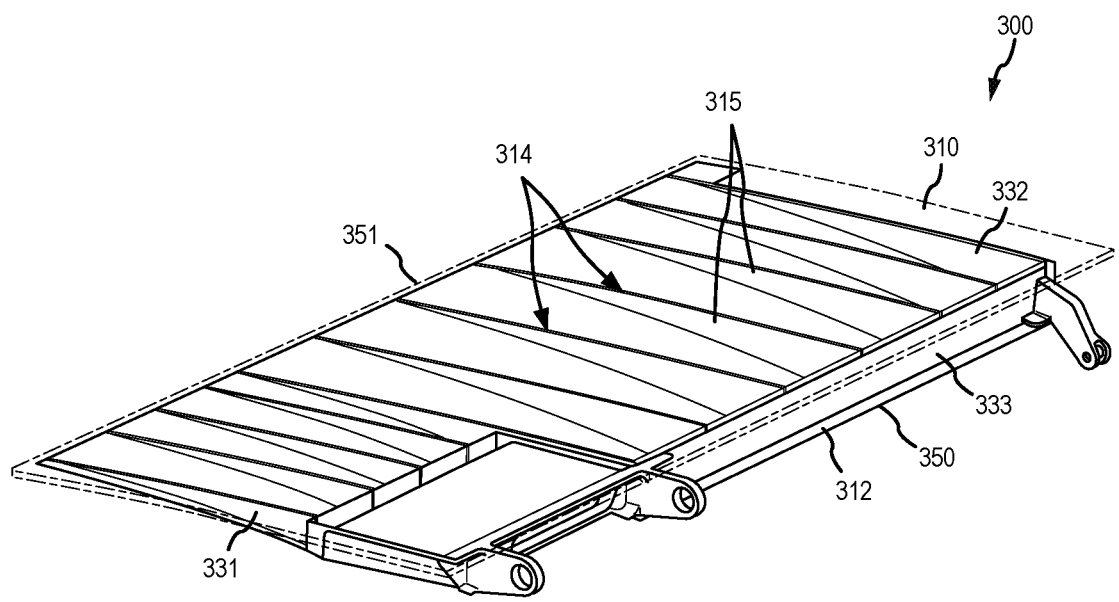
FIG. 3 illustrates an isometric view of a control surface, with a first skin illustrated as being transparent to reveal internal stiffener structures disposed between the first skin and a second skin of the control surface, in accordance with various embodiments.

With reference to FIG. 3, a control surface 300 is illustrated, in accordance with various embodiments. Control surface 300 may be similar to control surface 100 of FIG. 2C, except that stiffener features 314 of control surface 300 comprise elongated ribs 315 spaced apart between the first sidewall 331 and the second sidewall 332, each rib 315 extending lengthwise from the trailing edge 351 (also referred to herein as a second edge) of second skin 312 towards the leading edge 350 (also referred to herein as a first edge) of second skin 312. Stated differently, each elongate rib 315 may be oriented substantially orthogonal with respect to the leading edge 350. The stiffener features 314 are tapered towards second edge 351. In this regard, stiffener features 314 may conform to the geometry of first skin 310 and second skin 312. In various embodiments, stiffener features 314 may extend at various angles with respect to leading edge 350 without departing from the scope of the present disclosure. For example, stiffener features 314 be rotated approximately ninety degrees to extend parallel to third sidewall 333.

Figure 4:
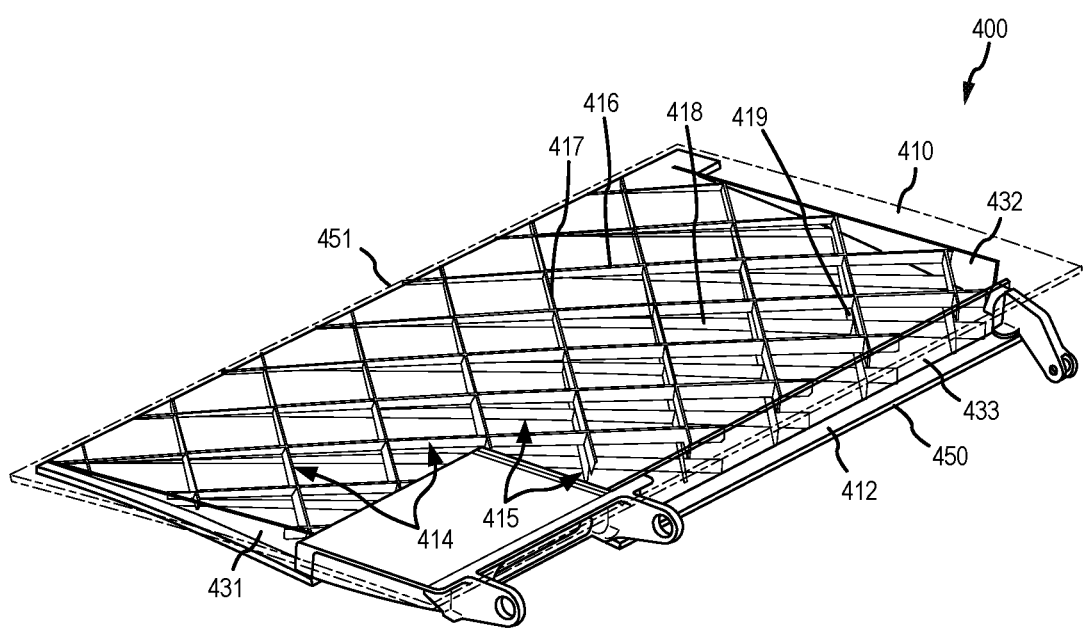
FIG. 4 illustrates an isometric view of a control surface, with a first skin illustrated as being transparent to reveal internal stiffener structures disposed between the first skin and a second skin of the control surface, in accordance with various embodiments.

With reference to FIG. 4, a control surface 400 is illustrated, in accordance with various embodiments. Control surface 400 may be similar to control surface 100 of FIG. 2C, except that control surface 400 comprises a first plurality of stiffener features 414 disposed on the inner surface of first skin 410 and a second plurality of stiffener features 415 disposed on the inner surface of second skin 412. Control surface 400 may comprise a first sidewall 431, a second sidewall 432, and a third sidewall 433.

The first plurality of stiffener features 414 may comprise a first plurality of spaced apart, elongated ribs 416 extending along a first direction, and a second plurality of spaced apart, elongated ribs 417 extending along a second direction and intersecting with the first plurality of spaced apart, elongated ribs 416. Each of the ribs 415, 416 may be tapered towards the second edge 451. In contrast to the stiffener features 114 of FIG. 2C, stiffener features 414 are coupled to first skin 410 and are spaced apart from second skin 412. Stated differently, stiffener features 414 are connected to first skin 410 without direct contact with second skin 412. In this regard, first skin 410 is stiffened via stiffener features 414, independent of stiffener features 415. Similarly, the second plurality of stiffener features 415 may comprise a first plurality of spaced apart, elongated ribs 418 extending along a first direction, and a second plurality of spaced apart, elongated ribs 419 extending along a second direction and intersecting with the first plurality of spaced apart, elongated ribs 418. Each of the ribs 418, 419 may be tapered towards the second edge 451. In contrast to the stiffener features 114 of FIG. 2C, stiffener features 415 are coupled to second skin 412 and are spaced apart from first skin 410. Stated differently, stiffener features 415 are connected to second skin 412 without direct contact with first skin 410. In this regard, second skin 412 is stiffened via stiffener features 415, independent of stiffener features 414. Furthermore, stiffener features 414 are spaced apart from stiffener features 415. Stiffener features 414 may be spaced apart from stiffener features 415 such that stiffener features 414 do not make direct physical contact with stiffener features 415.

In various embodiments, first plurality of stiffener features 414 disposed on the inner surface of first skin 410 may be formed into any suitable pattern (e.g., crisscross pattern as shown or any other pattern) and is not intended to be limited by the illustrated pattern. Similarly, second plurality of stiffener features 415 disposed on the inner surface of second skin 412 may be formed into any suitable pattern (e.g., crisscross pattern as shown or any other pattern) and is not intended to be limited by the illustrated pattern.

It is contemplated herein that any combination of the described stiffening methods may be utilized (e.g., a combination of the stiffener structures 114 of FIG. 2A and FIG. 2B and the stiffener structures 414 of FIG. 4).

Figure 5:
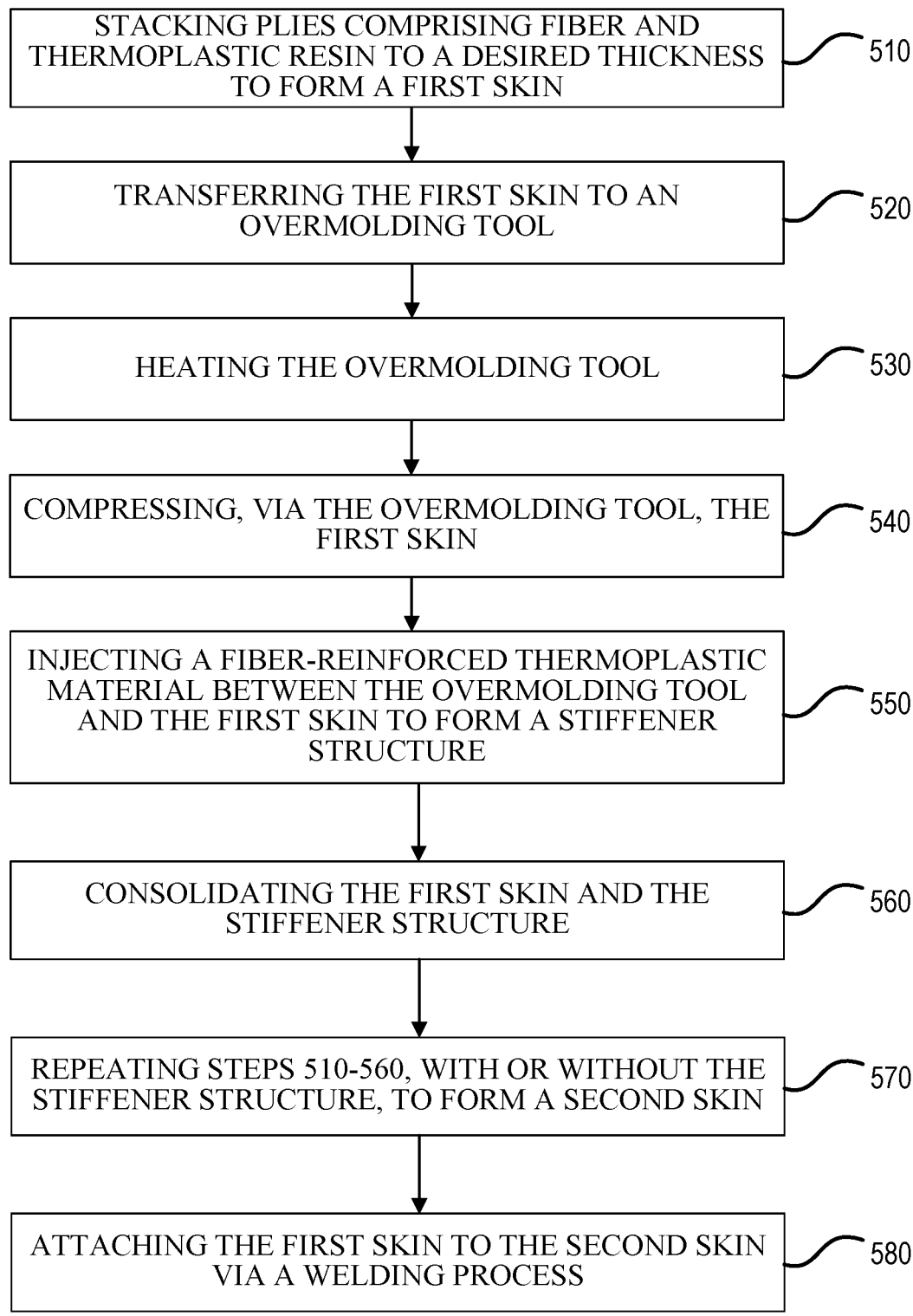
FIG. 5 illustrates a flow chart for a method for manufacturing a fiber-reinforced thermoplastic control surface, in accordance with various embodiments.

With reference to FIG. 5, a method 500 for manufacturing a control surface is provided, in accordance with various embodiments. Method 500 includes stacking plies comprising fiber and thermoplastic resin to a desired thickness to form a first skin (step 510). Method 500 includes transferring the first skin to an overmolding tool (step 520). Method 500 includes heating the overmolding tool (step 530). Method 500 includes compressing, via the overmolding tool, the first skin (step 540). Method 500 includes injecting a fiber-reinforced thermoplastic material between the overmolding tool and the first skin to form a stiffener structure (step 550). Method 500 includes consolidating the first skin and the stiffener structure (step 560). Method 500 includes forming a second skin (step 570). Method 500 includes attaching the first skin to the second skin via a welding process (step 580).

Figure 6A:
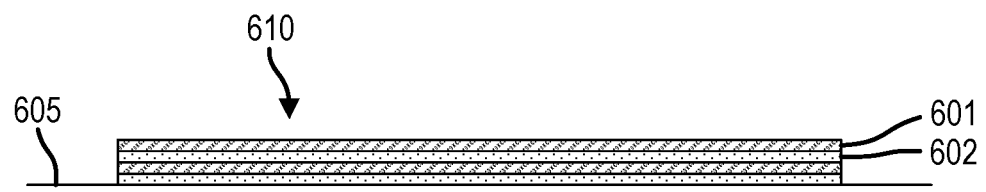
FIG. 6A, FIG. 6B, FIG. 6C, FIG. 6D, and FIG. 6E illustrate various manufacturing steps of the method of FIG. 5, in accordance with various embodiments.

With combined reference to FIG. 5 and FIG. 6A, step 510 may include stacking plies of fiber-reinforced thermoplastic sheets 601 and fiber-reinforced thermoplastic sheets 602 to a desired thickness to form a first skin 610. In various embodiments, and for ease of handling, the sheets may be stacked on a flat surface 605. In various embodiments, sheets 601 comprise fiber sheets pre-impregnated with a thermoplastic resin. However, it is contemplated that various types of fiber and/or thermoplastic resin sheets may be used to form first skin 610. For example, the sheets may comprise pre-impregnated fibers, separate sheets of fiber and resin, fiber sheets impregnated on demand during the stacking process, among others. The sheets 601, 602 may be tacked together during the stacking process to prevent deconsolidation in response to the first skin 610 being moved to an overmolding tool.

Figure 6B:
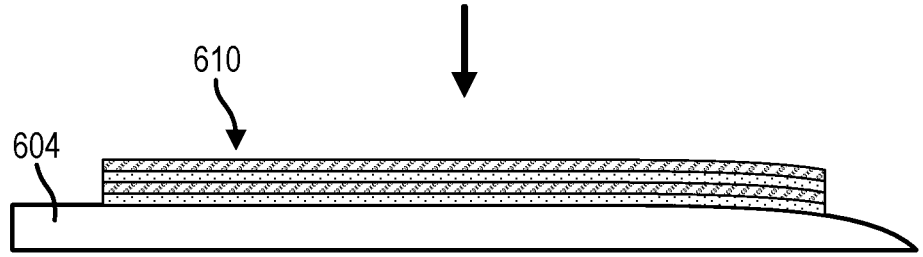

With combined reference to FIG. 5 and FIG. 6B, step 520 may include transferring the first skin 610 to an overmolding tool 604. First skin 610 may be transferred to overmolding tool 604 by hand or using an automated process.

Figure 6C:
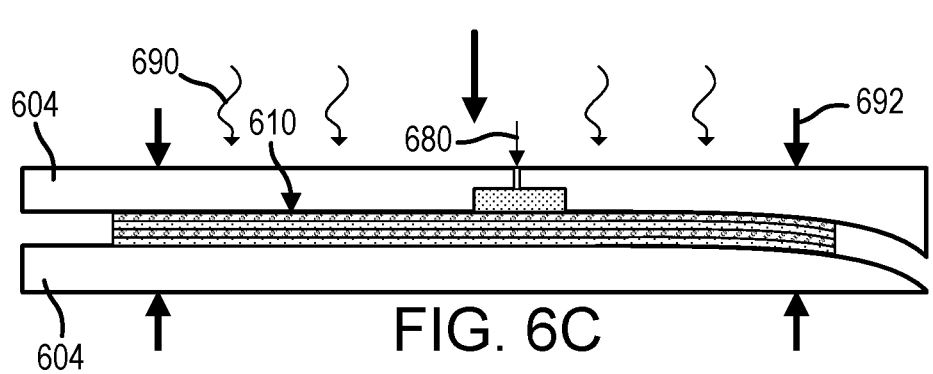

With combined reference to FIG. 5 and FIG. 6C, step 530 may include heating overmolding tool 604. In this regard, heat, as illustrated by arrows 690 in FIG. 6C, may be applied to overmolding tool 604. Heat may be applied via any suitable method including convective heating, conductive heating, inductive heating, etc.

With combined reference to FIG. 5 and FIG. 6C, step 540 may include compressing, via the overmolding tool 604, the first skin 610. In this regard, a force, illustrated by arrows 692 in FIG. 6C, may be applied to overmolding tool 604 to compress first skin 610. Compressing first skin 610 may tend to increase the density of first skin 610 and shape the first skin 610 to a desired geometry, such as a partial airfoil geometry for example.

With combined reference to FIG. 5 and FIG. 6C, step 550 may include injecting a fiber-reinforced thermoplastic material, depicted by arrow 680 in FIG. 6C, between the overmolding tool 604 and the first skin 610 to form a stiffener structure 614 (see FIG. 6D) on an inner surface 626 of first skin 610.

Figure 6D:
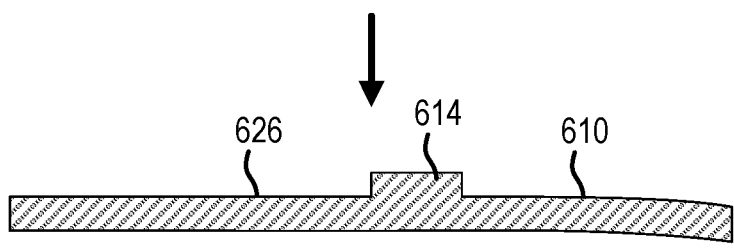

With combined reference to FIG. 5 and FIG. 6D, step 560 may include consolidating the first skin 610 and the stiffener structure 614. The first skin 610 and stiffener structure 614 may be consolidated in response to the heat and pressure being applied thereto which causes the thermoplastic resin sheets 602 to cure to form a single sheet of fiber-reinforced thermoplastic (i.e., first skin 610). In accordance with various embodiments, method 600 provides a process for simultaneously consolidating first skin 610 and stiffener structure 614 which may tend to enhance the bond between first skin 610 and stiffener structure 614 and/or decrease production cycle time.

In various embodiments, the method further comprises cooling, actively or passively, the overmolding tool 604 and/or the first skin 610 and the stiffener structure 614, wherein the first skin 610 and the stiffener structure 614 harden in response to being cooled. In various embodiments, with reference to FIG. 6D, the method further comprises removing the hardened first skin 610 and stiffener feature 614, which is now bonded to first skin 610, from the overmolding tool 604.

In various embodiments, step 570 may include forming a second skin. The second skin may be manufactured using method 500 with or without the stiffener structure. For example, first skin 110 and second skin 112 may be separately manufactured utilizing method 500 (see FIG. 1).

Figure 6E:
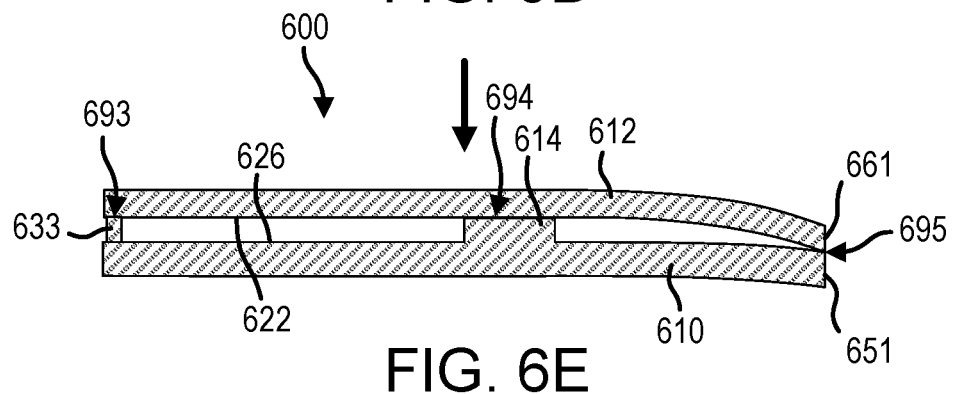

In various embodiments, with combined reference to FIG. 5 and FIG. 6E, step 580 may include joining first skin 610 to second skin 612 using welding, as disclosed herein to form a complete, unitary control surface. FIG. 6E illustrates a section view of control surface 600 having a third sidewall 633 (e.g., a leading edge sidewall). The third sidewall 633 may be overmolded onto first skin 610 or second skin 612 using a similar overmolding process as used to form stiffener feature 614 as described with respect to FIG. 6C. In various embodiments, stiffener feature 614 and third sidewall 633 are formed simultaneously or near simultaneously in a single-stage process. The welding process causes the first skin 610 and second skin 612 to locally melt at interfaces thereof (i.e., the locations at which first skin 610 and second skin 612 make contact), such as the interface 693 between third sidewall 633 and the inner surface 622 of second skin 612, the interface 694 between stiffener feature 614 and inner surface 622 of second skin 612, and the interface 695 between the trailing edge 651 of first skin 610 and the trailing edge 661 of second skin 612. When the welding is complete the first skin 610 and second skin 612 may cool and bond together to form a unitary piece of material.

In accordance with various embodiments, sidewalls, stiffening features, raised pads, and hinges, as described herein, may be formed onto a control surface skin using method 500.

Figure 7:
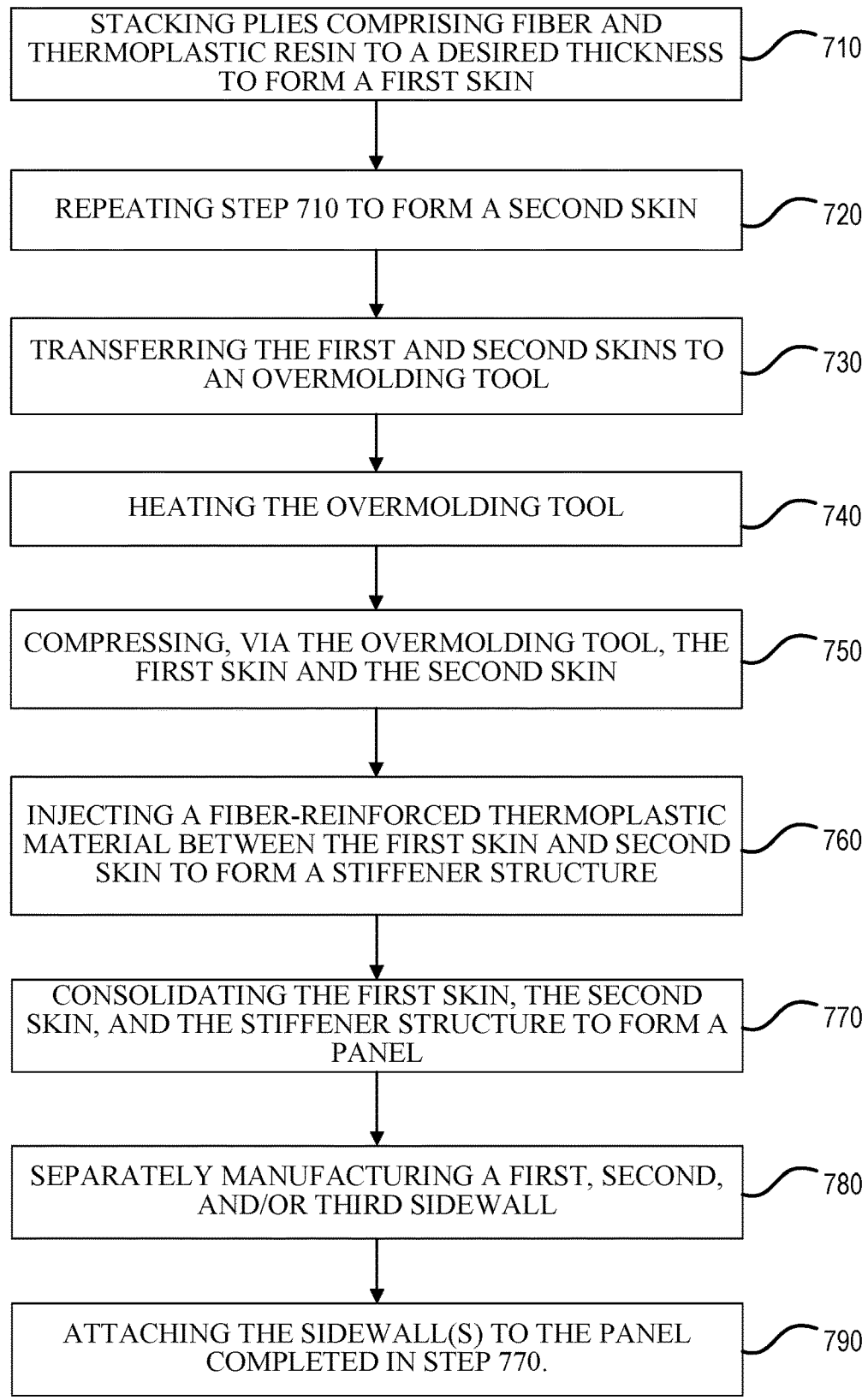
FIG. 7 illustrates a flow chart for a method for manufacturing a fiber-reinforced thermoplastic control surface, in accordance with various embodiments.

With reference to FIG. 7, a method 700 for manufacturing a control surface is provided, in accordance with various embodiments. Method 700 includes stacking plies comprising fiber and thermoplastic resin to a desired thickness to form a first skin (step 710). Method 700 includes repeating step 710 to form a second skin (step 720). Method 200 includes transferring the first skin and the second skin to an overmolding tool (step 730). Method 700 includes heating the overmolding tool (step 740). Method 700 includes compressing, via the overmolding tool, the first skin and the second skin (step 750). Method 700 includes injecting a fiber-reinforced thermoplastic material between the first skin and the second skin to form a stiffener structure (step 760). Method 700 includes consolidating the first skin, the second skin, and the stiffener structure to form a panel (step 770). Method 700 includes separately manufacturing a first, second, and/or third sidewall (step 780). Method 700 includes attaching the sidewall(s) to the panel completed in step 770 (step 790).

Figure 8A:
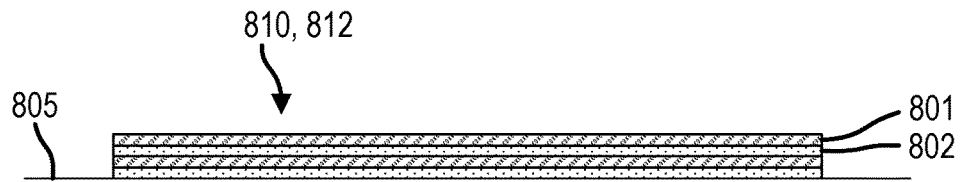
FIG. 8A, FIG. 8B, FIG. 8C, FIG. 8D, and FIG. 8E illustrate various manufacturing steps of the method of FIG. 7, in accordance with various embodiments.

With combined reference to FIG. 7 and FIG. 8A, step 710 may include stacking plies of fiber-reinforced thermoplastic sheets 801 and fiber-reinforced thermoplastic sheets 802 to a desired thickness to form a first skin 810. In various embodiments, and for ease of handling, the sheets may be stacked on a flat surface 805. In various embodiments, sheets 801 comprise fiber sheets pre-impregnated with a thermoplastic resin. However, it is contemplated that various types of fiber and/or thermoplastic resin sheets may be used to form first skin 810. For example, the sheets may comprise pre-impregnated fibers, separate sheets of fiber and resin, fiber sheets impregnated on demand during the stacking process, among others. The sheets 801, 802 may be tacked together during the stacking process to prevent deconsolidation in response to the first skin 810 being moved to an overmolding tool.

With combined reference to FIG. 7 and FIG. 8A, step 720 may include repeating step 710 to form a second skin 812.

Figure 8B:
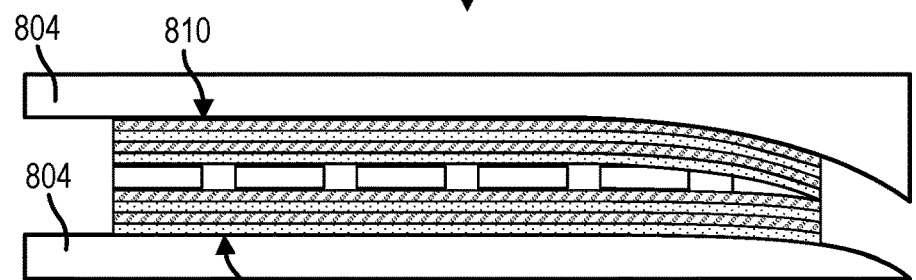

With combined reference to FIG. 7 and FIG. 8B, step 730 may include transferring the first skin 810 and the second skin 812 to an overmolding tool 804. First skin 810 and second skin 812 may be transferred to overmolding tool 804 by hand or using an automated process.

Figure 8C:
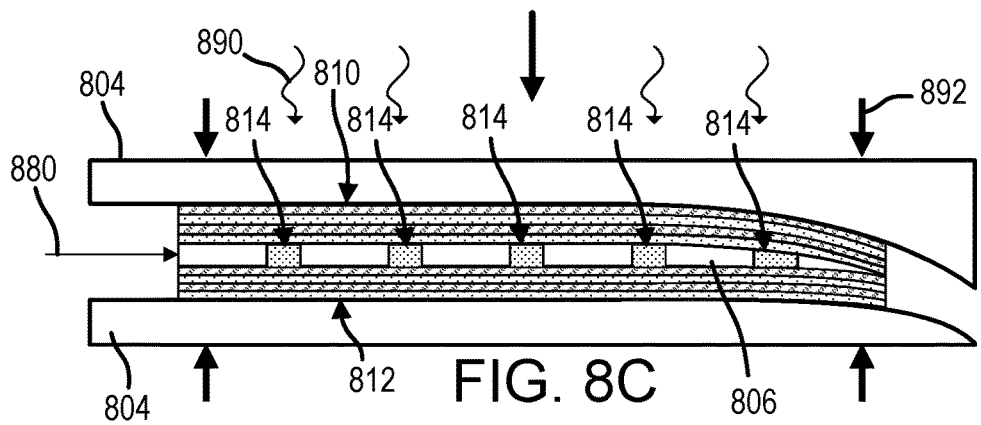

With combined reference to FIG. 7 and FIG. 8C, step 740 may include heating overmolding tool 804. In this regard, heat, as illustrated by arrows 890 in FIG. 8C, may be applied to overmolding tool 804. Heat may be applied via any suitable method including convective heating, conductive heating, inductive heating, etc.

With combined reference to FIG. 7 and FIG. 8C, step 750 may include compressing, via the overmolding tool 804, the first skin 810 and the second skin 820. In this regard, a force, illustrated by arrows 892 in FIG. 8C, may be applied to overmolding tool 804 to compress first skin 810. Compressing first skin 810 may tend to increase the density of first skin 810 and second skin 812 and shape the first skin 810 and second skin 812 to a desired geometry, such as a partial airfoil geometry for example.

With combined reference to FIG. 7 and FIG. 8C, step 760 may include injecting a fiber-reinforced thermoplastic material, depicted by arrow 880 in FIG. 8C, between the first skin 810 and the second skin 812 to form a stiffener structure 814 (see FIG. 8D) on an inner surface 826 of first skin 810 and/or an inner surface 822 of second skin 812. In various embodiments, overmolding tool 804 comprises a core member 806 at least partially defining the stiffener structure 814. Core member 806 may be sandwiched between first skin 810 and second skin 812 and may comprise passages through which the fiber-reinforced thermoplastic material flows during the injection process.

Figure 8D:
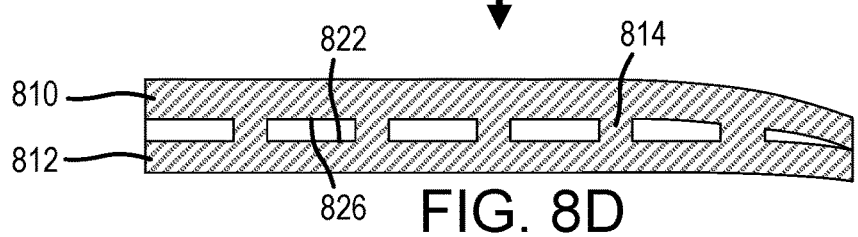

With combined reference to FIG. 7 and FIG. 8D, step 770 may include consolidating the first skin 810, the second skin 812, and the stiffener structure 814. The first skin 810, the second skin 812, and stiffener structure 814 may be consolidated in response to the heat and pressure being applied thereto which causes the thermoplastic resin sheets 802 to cure to form a single sheet of fiber-reinforced thermoplastic (i.e., first skin 810 and second skin 812). In accordance with various embodiments, method 800 provides a process for simultaneously consolidating first skin 810, second skin 812, and stiffener structure 814 which may tend to enhance the bond between first skin 810, second skin 812, and stiffener structure 814 and/or decrease production cycle time.

In various embodiments, the method further comprises cooling, actively or passively, the overmolding tool 804 and/or the first skin 810, the second skin 812, and the stiffener structure 814, wherein the first skin 810, the second skin 812, and the stiffener structure 814 harden in response to being cooled. In various embodiments, with reference to FIG. 8D, the method further comprises removing the hardened first skin 810, the second skin 812, and stiffener feature 814, which is now bonded to first skin 810 and the second skin 812, from the overmolding tool 804.

In various embodiments, step 780 may include separately manufacturing first, second, and/or third sidewalls (e.g., see first sidewall 131, second sidewall 132, and third sidewall 133 of FIG. 2B). The sidewall(s) may be manufactured using a stamping process or any other suitable process.

Figure 8E:
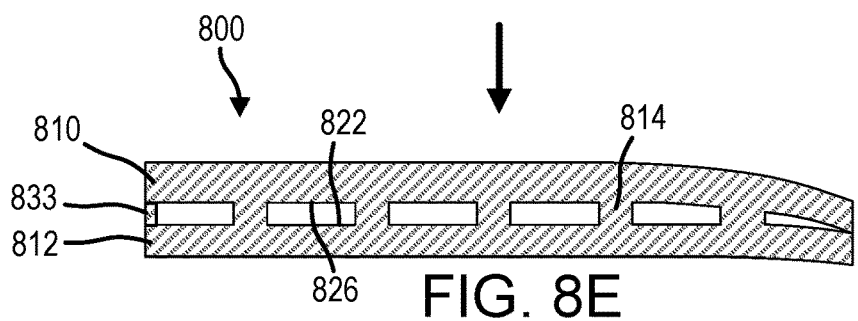

In various embodiments, with combined reference to FIG. 7 and FIG. 8E, step 790 may include joining the sidewall(s) to first skin 810 and/or second skin. FIG. 8E illustrates a section view of control surface 800 having a third sidewall 833 (e.g., a leading edge sidewall). The third sidewall 833 may be overmolded onto first skin 810 and/or second skin 812 using a similar overmolding process as used to form stiffener feature 814 as described with respect to FIG. 8C. In various embodiments, stiffener feature 814 and third sidewall 833 are formed simultaneously or near simultaneously in a single-stage process. In various embodiments, third sidewall 833 is attached to first skin 810 and second skin 812 via a welding process, as described herein. In various embodiments, third sidewall 833 is attached to first skin 810 and second skin 812 via adhesive bonding. In various embodiments, third sidewall 833 is attached to first skin 810 and second skin 812 via mechanical fasteners. First and second sidewalls may be similarly attached to opposing sides of the first and second skins to enclose the control surface 800. In accordance with various embodiments, sidewalls, stiffening features, raised pads, and hinges, as described herein, may be formed onto a control surface skin using method 700.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a fiber-reinforced thermoplastic control surface, comprising:
   stacking plies of thermoplastic composite sheets to a desired thickness to form a first skin;
   transferring the first skin to an overmolding tool;
   heating the overmolding tool;
   compressing, via the overmolding tool, the first skin;
   injecting a discontinuous fiber-reinforced thermoplastic material between the overmolding tool and the first skin to form a stiffener structure;
   simultaneously consolidating the first skin and the stiffener structure, wherein the first skin is formed into a desired shape in response to being compressed by the overmolding tool;
   attaching the first skin to a second skin; and
   attaching a sidewall between and to the first skin and the second skin, wherein the sidewall at least partially encloses the stiffener structure between the first skin and the second skin.

2. The method of claim 1, further comprising cooling the overmolding tool, wherein the first skin and the stiffener structure harden in response to the overmolding tool cooling.

3. The method of claim 2, further comprising removing the hardened first skin and stiffener structure from the overmolding tool.

4. The method of claim 3, further comprising:
   stacking plies of thermoplastic composite sheets to a second desired thickness to form the second skin;
   heating the second skin;
   compressing the second skin; and
   consolidating the second skin.

5. The method of claim 4, further comprising attaching the first skin to the second skin.

6. The method of claim 5, wherein the first skin is attached to the second skin via a welding process.

7. The method of claim 5, further comprising attaching the stiffener structure to the second skin.

8. The method of claim 1, further comprising:
   stacking plies of thermoplastic composite sheets to a desired thickness to form the second skin;
   transferring the second skin to the overmolding tool;
   compressing, via the overmolding tool, the first skin and the second skin;
   wherein injecting the discontinuous fiber-reinforced thermoplastic material between the overmolding tool and the first skin to form the stiffener structure comprises injecting the fiber-reinforced thermoplastic material between the first skin and the second skin to form the stiffener structure therebetween; and
   wherein simultaneously consolidating the first skin and the stiffener structure comprises consolidating the first skin, the second skin, and the stiffener structure.

9. The method of claim 1, wherein the sidewall is attached to the first skin and the second skin via at least one of a welding process, an adhesive bonding, and a mechanical fastener.

10. The method of claim 1, wherein the sidewall encloses the fiber-reinforced thermoplastic control surface.

11. The method of claim 1, wherein:
    the first skin comprises a first continuous fiber reinforced fabric and a first thermoplastic resin;
    the second skin comprises a second continuous fiber reinforced fabric and a second thermoplastic resin; and
    the stiffener structure is formed from a first discontinuous fiber reinforced fabric and a third thermoplastic resin.

12. The method of claim 11, wherein the sidewall is formed from a second discontinuous fiber reinforced fabric and a fourth thermoplastic resin.

13. The method of claim 7, wherein the stiffener structure extends from a first inner surface of the first skin.

14. The method of claim 13, further comprising forming a raised pad onto a second inner surface of the second skin, wherein the stiffener structure extends between and to the first inner surface of the first skin and the raised pad.

15. The method of claim 1, further comprising forming a first hinge to extend from at least one of the first skin, the second skin, and the sidewall, wherein forming the hinge comprises an overmolding process.

16. The method of claim 15, further comprising forming a second hinge to extend from at least one of the first skin, the second skin, and the sidewall.

17. The method of claim 14, wherein the stiffener structure comprises a cylindrical body.

18. The method of claim 1, wherein the stiffener structure comprises:
   a first plurality of spaced apart, elongated ribs extending along a first direction; and
   a second plurality of spaced apart, elongated ribs extending along a second direction and intersecting with the first plurality of spaced apart, elongated ribs.

19. The method of claim 18, further comprising:
   stacking plies of thermoplastic composite sheets to a second desired thickness to form the second skin;
   heating the second skin;
   compressing the second skin;
   injecting a discontinuous fiber-reinforced thermoplastic material between the overmolding tool and the second skin to form a second stiffener structure; and
   simultaneously consolidating the second skin and the second stiffener structure,
   wherein the second stiffener structure comprises:
      a third plurality of spaced apart, elongated ribs extending along a third direction; and
      a fourth plurality of spaced apart, elongated ribs extending along a fourth direction and intersecting with the third plurality of spaced apart, elongated ribs.

* * * * *